July 10, 1945.   H. J. TICKELL   2,380,088
STEREOSCOPIC APPARATUS
Filed Feb. 23, 1942   3 Sheets-Sheet 1

Inventor:
Herbert J. Tickell
By Robert F. Midley
Atty.

July 10, 1945. H. J. TICKELL 2,380,088
STEREOSCOPIC APPARATUS
Filed Feb. 23, 1942 3 Sheets-Sheet 2

Inventor:
Herbert J. Tickell.
By Robert H. Mudle
Atty.

July 10, 1945.  H. J. TICKELL  2,380,088
STEREOSCOPIC APPARATUS
Filed Feb. 23, 1942  3 Sheets—Sheet 3

Inventor:
Herbert J. Tickell
By Robert F. Mehl
Atty.

Patented July 10, 1945

2,380,088

UNITED STATES PATENT OFFICE 2,380,088

STEREOSCOPIC APPARATUS

Herbert J. Tickell, Chicago, Ill.

Application February 23, 1942, Serial No. 432,019

10 Claims. (Cl. 88—31)

My invention relates particuarly to stereoscopic apparatus utilizing standard motion picture films as the picture mediums.

Objects of the invention reside in the provision of novel and desirable stereoscopic apparatus involving two picture strips such as standard motion picture film strips for carrying a succession of stereoscopically related pairs of pictures, which involves a photographic camera provided with a novel photographic strip feeding means for advancing two strips in correspondence to photograph a succession of stereoscopically related pairs of pictures thereon, which involves a stereoscopic viewer provided with a corresponding novel strip feeding means for advancing in correspondence two strips bearing a succession of stereoscopically related pairs of pictures for the successive viewing thereof such as the strips exposed in the camera and developed or strips bearing reproductions of the pictures thereof, which is susceptible to the practical utilization of standard motion picture film such as standard 35 mm. motion picture film, which contemplates a desirable dimension of the picture frame while utilizing standard motion picture film, and the transposition of the picture strips in the viewer relative to their position in the exposing camera in order that the scenes are viewed in the viewer as the original scenes were presented to the camera.

Other objects of the invention reside in the provision of such apparatus which is economical as to manufacture, which, particularly as relates to a stereoscopic viewer, is convenient in use and is desirably adapted to be constructed mainly of wood or other non-metallic material, and which is susceptible to stereoscopic apparatus of desirable size and shape.

The invention will be better understood by reference to the accompanying drawings in which—

Figure 1:
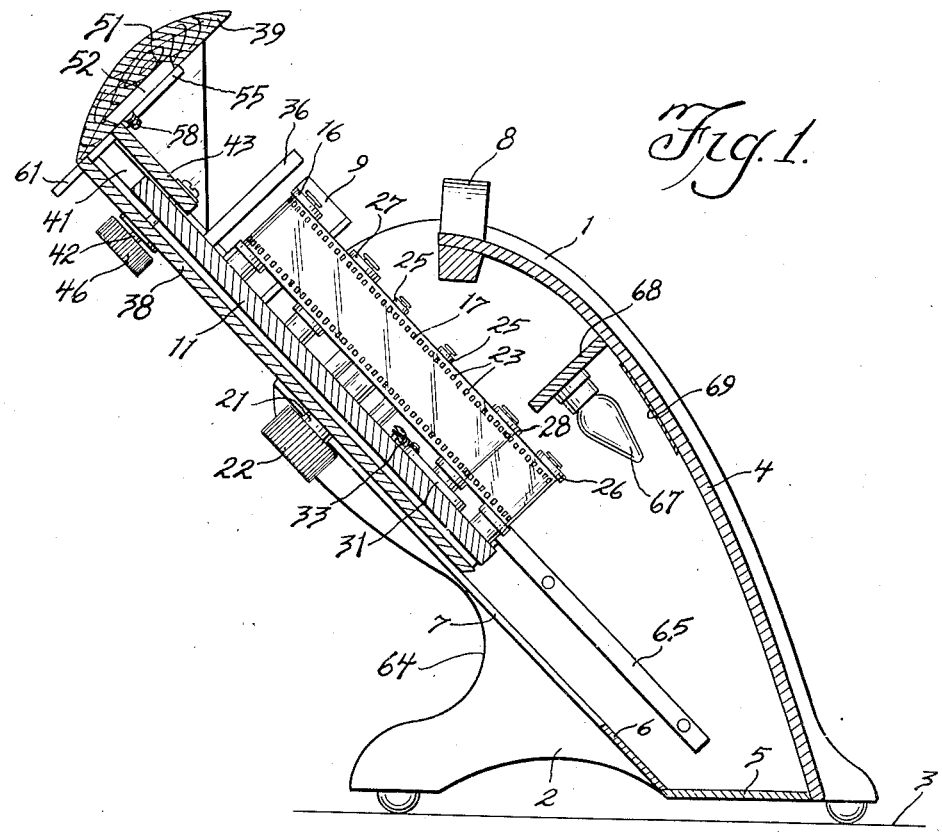
Figure 1 is a sectional side elevational view of a stereoscopic viewer embodying one form of my invention and showing the viewer unit thereof partially removed from the casing thereof.
Figure 2:
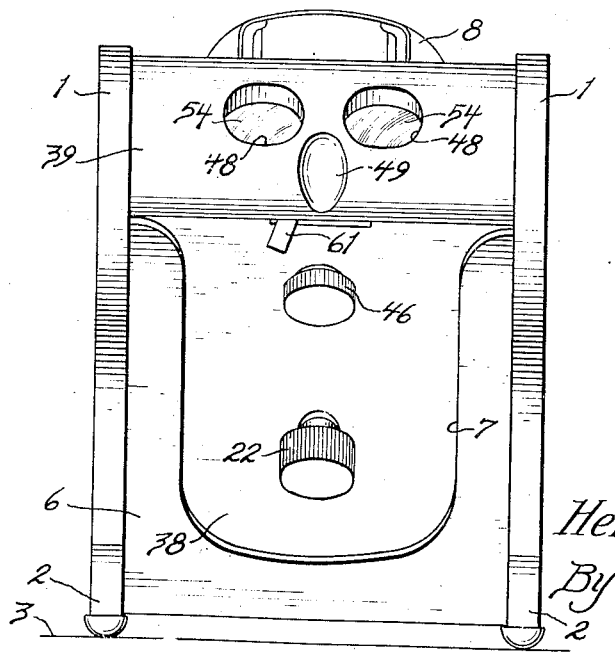
Figure 2 is a front view of the viewer.
Figures 3, 8:
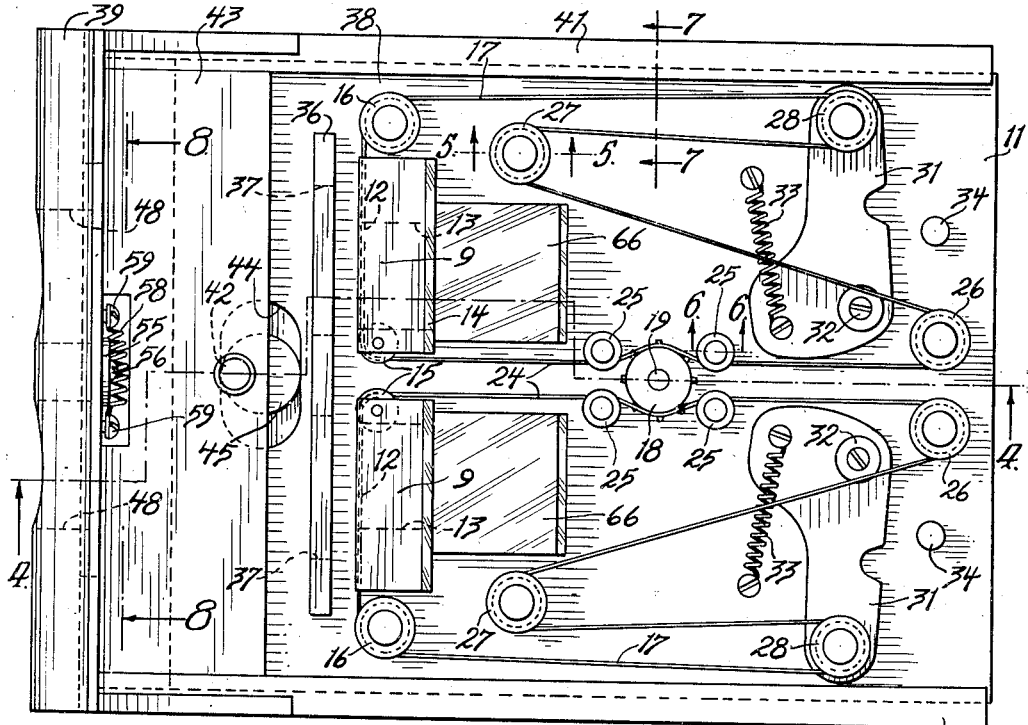
Figure 3 is a top plan view of the aforesaid viewer unit.
Figure 8 is a partial sectional view substantially on the line 8—8 of Figure 3.

Referring to Figures 1 to 8 of the drawings, a supporting casing is mainly formed by spaced vertically disposed side members 1, the lower portions 2 of which form a foot portion for supporting the casing on a horizontal supporting surface 3 such as that of a table top, and a wall member 4 extending between the side members from the lower rear portions thereof upwardly and forwardly in an exteriorly convex form to the top of the side members and forming with the side members an enclosure above the supporting surface 3 having a front opening. See particularly Figures 1, 2 and 4. A flat horizontal bottom wall member 5 extends between the side members at the rear portions of the lower ends thereof and extends a short distance forwardly from the lower end of the wall member 4, and another flat wall member 6 extends between the side members and extends diagonally upwardly and forwardly from the front edge of the bottom wall member 5 in spaced relation with the wall member 4, the wall members and side members being suitably secured together to provide a rigid casing having a front opening. The wall member 6 is provided with a large centrally disposed opening 7 extending downwardly from the upper edge thereof for a purpose hereinafter apparent, and the wall member 4 is provided at its upper end with a convenient carrying handle 8.

A viewing unit is disposable in the casing and is removable and insertable therein through the front opening thereof and comprises as follows:

Two similarly disposed picture plane forming film strip feed guides 9 spaced longitudinally thereof are secured in transverse upright relation on and above a flat rectangular frame or base 11 and have the strip guide surfaces 12 thereof alined and facing forwardly. See particularly Figures 3 and 4. The feed guides are provided with usual light apertures 13 for the projection of light forwardly therethrough and are provided at the rear thereof with light diffusing frosted glass plates 14 extending across the light apertures 13 which may be tinted for filtering the light passing therethrough.

Film strip guide rollers 15 are rotatably mounted on the adjacent ends of the guides 9, and film strip guide rollers 16 are rotatably mounted on the frame 11 above the same at the remote ends of the guides, these rollers serving to guide two tensioned feed perforated picture bearing film strips 17, such as standard motion picture film strips, each strip comprising an endless belt, respectively to and from the guides from the rear thereof, the guides forming a viewing or picture plane for the portions of the film strips respectively engaged thereon.

A feed sprocket 18 is rotatably mounted on the frame 11 above the same by reason of it being secured on a shaft 19 extending downwardly through the frame and rotatably mounted in a bushing 21 extending through and secured with the base. A knob 22 is secured on the lower end of the shaft 19 and is accessible from below the frame 11 for the manual rotation of the feed sprocket.

The feed sprocket 18 is disposed to the rear of the picture plane of the guides 9 in central relation therewith and is disposed between and opposedly operatively engages feed perforations 23 of stretches 24 of the film strips 17 extending from the adjacent ends of the guides 9 for feeding the film strips in synchronism respectively through the guides 9. Guide rollers 25 are rotatably mounted on the frame 11 above the same adjacent the sprocket 18 and engage the film strips 17 in opposition to the sprocket for retaining the sprocket in feeding engagement with the feed perforations of the film strips.

In addition to the guide rollers aforementioned, two sets of spaced rotatable guide rollers are disposed to the rear of the picture plane of the guides 9 and above the frame 11 and respectively engage the film strips 17 between the feed sprocket 18 and the remote ends of the guides, and the rollers of each set are spaced in zigzag arrangement normally of the plane of the guides and provide a corresponding zigzag path of the film strip engaged thereby to provide a compact arrangement of the film strips as compared to the length thereof.

Each of these sets of guide rollers comprises a rearwardly disposed roller 26, a forwardly disposed roller 27 and another rearwardly disposed roller 28, each film strip 17 leading rearwardly from the feed sprocket 18 to and about a roller 26, then forwardly to and about a roller 27, then rearwardly to and about a roller 28, and then forwardly to and about a roller 16.

Figure 5:
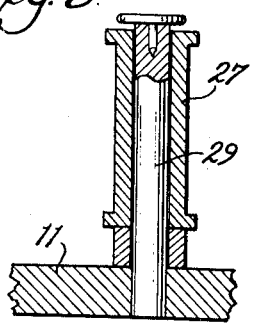
Figure 5 is a partial section substantially on the line 5—5 of Figure 3.
Figure 6:
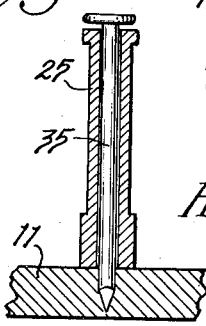
Figure 6 is a partial section substantially on the line 6—6 of Figure 3.
Figure 7:
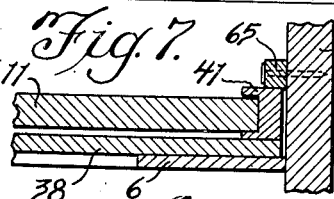
Figure 7 is a partial section substantially on the line 7—7 of Figure 3.

The rollers 16, 26 and 27 are similarly rotatably mounted on the frame 11 by means of spindles 29 secured on and projecting upwardly from the frame and on which these rollers are rotatably engaged, as illustrated in Figure 5 with reference to a roller 27. The rollers 28 are similarly rotatably mounted respectively on the outer or remote ends of oppositely related transversely disposed tensioning arms 31, above the frame 11, the inner or adjacent ends of which are pivotally mounted on the frame 11, as designated at 32, to provide rearward movement of the rollers 28 to tension the film, and tension springs 33 are operative between the arms 31 and the frame 11 to yieldably urge the rollers 28 rearwardly to tension the film strips 17. Stop pins 34 on the frame 11 are engageable by the arms 31 in opposition to the springs 33 to limit rearward movement of the rollers 28 for an obvious reason. The rollers 25 are rotatably mounted on the frame 11 by means of standard headed nails 35 driven downwardly into the frame 11 and upon which the rollers 25 are rotatably mounted, as illustrated in Figure 6.

Secured in upright transversely disposed relation on and above the frame 11 forwardly of the guides 9, is a mask member 36 provided with transversely spaced view apertures 37 respectively alined with the light apertures 13 of the guides 9 for masking the view from a forward position of the portions of the film strips 17 positioned at the guides 9.

A second frame comprises generally a flat frame part 38 and a transversely disposed wall part 39 fixed with and extending upwardly from the forward end of the frame part 38. This second frame is connected with the frame 11, so that the frame part 38 is disposed correspondingly with the frame 11 and in underlying relation therewith and with the wall part 39 forwardly disposed from the guides 9, by means of forwardly and rearwardly extending parallel opposing channeled slide guide members 41 secured downwardly on and respectively along the side edges of the frame part 38 and slidably engaging therebetween the side edges of the frame 11 to provide relative movement between the frame 11 and the second frame normal to the picture plane provided by the guides 9. See Figures 3 and 7.

A shaft 42, arranged in upright relation with the frame 11 and frame part 38, extends through the frame part 38 and a shelf part 43 secured to the wall part 39 and extending rearwardly therefrom in overlying relation with the front portion of the frame 11 and is rotatably mounted on the frame part 38 and shelf part 43. See Figures 1, 3 and 4. The shaft 42 also extends through a laterally disposed elongated aperture 44 through the front portion of the frame 11, and an eccentric 45 is secured on the shaft 42 and engages the aperture 44 to relatively adjust the frame 11 and the second frame comprising the frame part 38 and wall part 39 normal to the picture plane of the guides 9. A knob 46 is secured on the lower end of the shaft 42 and is accessible from below the frame 11 and frame part 38 for the manual rotation of the shaft 42.

The bushing 21 and shaft 19 extend downwardly through a longitudinally elongated aperture 47 through the frame 11, see Figure 4, to accommodate longitudinal movement between the frame 11 and frame part 38, the film feed knob 22 being disposed below the frame part 38 as well as the frame 11 for the accessibility thereof from below the frames.

The wall part 39 of the second frame is provided with a pair of laterally spaced viewing apertures 48 therethrough which are respectively alined with the light apertures 13 of the guides 9 for viewing, from the front of this wall part, the portions of the film strips 17 at the apertures 13 respectively by the eyes of the user, the front surface of this wall part being provided with a depression 49 to accommodate the nose of the user. See Figures 2 and 4.

The rear face of the wall part 39 is provided at its rear face with an undercut slide channel 51 extending transversely or correspondingly with the common axial plane of the viewing apertures 48 and embracing the same. See particularly Figures 4 and 8. A pair of apertured carrier members 52 are independently slidably mounted in the channel 51 and respectively carry in their apertures 53 a pair of viewing lenses 54 for lateral adjustment of these lenses relative to the viewing apertures 48.

An adjusting member 55 at the rear of the wall member 39 is pivotally mounted, as designated at 56, on this wall member on an axis parallel to and between the axes of the viewing apertures 48 and is provided with diametrically opposite cam formations 57 between the carrier members 52 and operative respectively thereon for simultaneously oppositely adjusting the same away from each other, thus increasing the lateral separation of the lenses 54. A tension spring 58 has its opposite ends secured, as designated at 59, respectively with the carrier members 52 to actuate them toward each other in opposition to the cam formations 57. Accordingly, angular adjustment of the adjusting member 55 effects lateral adjustment of the viewing lenses 54 to accommodate the apparatus to the pupillary distance of the eyes of the instant user.

The adjusting member 55 is provided with an actuating arm 61 which projects downwardly therefrom through openings 62 and 63 respectively through the shelf part 43 and the frame part 38 and below this frame part to be accessible from below the same for manual actuation to laterally adjust the eye lenses 54.

The viewing unit just described is disposable within the enclosure of the casing, hereinabove described, in a position disposed above the wall member 6 or upwardly within said enclosure and extending forwardly and upwardly and with the wall member 39 closing the front opening of the casing above the wall member 6 for convenient viewing, the control knobs 22 and 46 and the control arm 61 being accessible from below the viewing unit and upwardly from the supporting surface 3 for convenient manipulation while viewing, it being noted that the opening 7 of the wall member 6 accommodates the control knobs and control arm. See Figures 2 and 4. The side members 1 of the casing have the front edges thereof, vertically intermediate the lower foot portions 2 thereof and the viewing unit, recessed rearwardly, as designated at 64, to accommodate either arm of the user, for convenience in manipulating the control means, particularly the strip feed knob 22.

Figure 4:
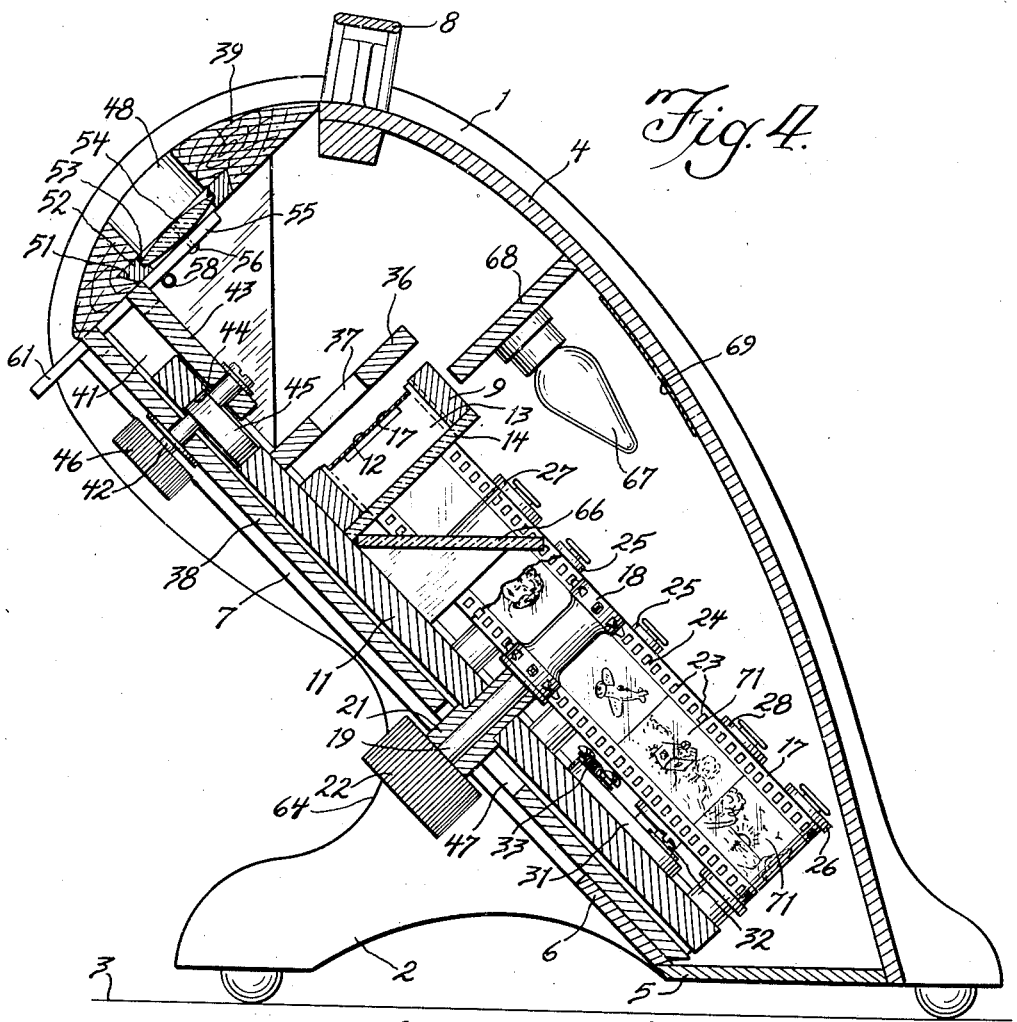
Figure 4 is a sectional view substantially on the line 4—4 of Figure 3 and showing the viewer unit fully installed in the casing.

Upwardly and forwardly extending slide bearing means is provided on the side members 1 of the casing for carrying the viewing unit for corresponding movement into and out of its forwardly and upwardly extending position, for removal of the viewing unit from the casing, as partially indicated in Figure 1, and insertion of the same therein, as shown in Figure 4, through the front opening of the casing, particularly for replacing the picture strips 17 with others bearing different pictures.

This slide bearing means comprises the wall member 6 downwardly on which the frame part 38 is slidably engageable and slide bearing strips 65 secured respectively to and on the insides of the side members 1 of the casing in upwardly spaced parallel relation with the wall member 6 and upwardly slidably engageable by the slide guide members 41. See Figures 1 and 7.

Secured on the frame 11 above the same and to the rear of the guides 9 are two laterally spaced reflecting mirrors 66 which are disposed with respect to the picture plane of the guides in upwardly and rearwardly extending relation. See Figures 3 and 4. Laterally spaced electric lamps 67 are mounted within the enclosure of the casing above the viewing unit at the rear of a laterally extending downwardly projecting support 68, and, when the viewing unit is in the casing as shown in Figure 1, light from the lamps 67 is reflected by the mirrors 66 forwardly through the light apertures 13 of the guides 9 for illuminating the portions of the picture strips 17 at the light apertures for viewing. A downwardly facing reflector 69 is secured on the wall 4 of the casing to reflect light from the lamps downwardly to the mirrors 66.

The picture strips 17, as shown, are developed standard motion picture film strips bearing corresponding successions of stereoscopically related pairs of pictures, as indicated at 71 in Figure 4, so that, as the picture strips are fed in synchronism through the guides 9 by means of the feed sprocket 18, the pairs of stereoscopically related pictures are successively registered with the light apertures 13 of the guides 9 for viewing.

Figure 9:
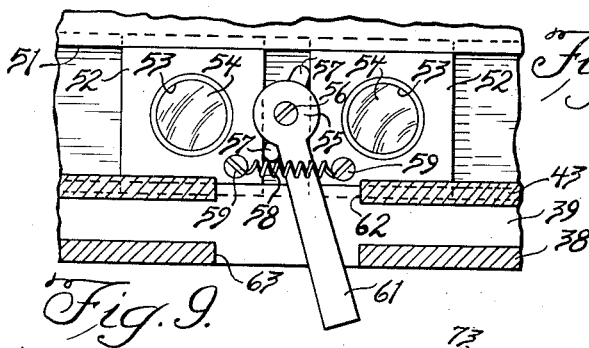
Figure 9 is a partial plan view of a stereoscopic camera illustrating another form of the picture strip feeding means of my invention which is particularly adapted to a stereoscopic camera, parts being broken away and shown in section.
Figure 10:
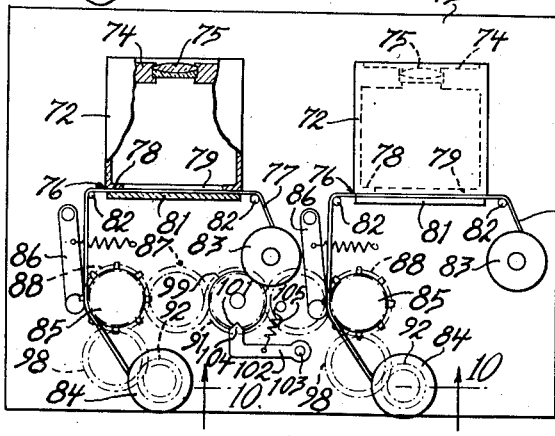
Figure 10 is a partial sectional view substantially on the line 10—10 of Figure 9.

Referring to Figures 9 and 10, which illustrate a preferred form of the picture or film strip feeding means of my invention as applied to a stereoscopic camera and which is adapted for the use of standard feed perforated film, two laterally spaced similarly disposed casing members 72 are mounted on a flat base 73. Front walls 74 of these casing members are provided with central apertures in which two matched photographic lenses 75 are respectively mounted in laterally spaced axially parallel relation. Two similarly disposed picture plane forming strip feed exposure guides, generally designated at 76, are alined and spaced longitudinally and are disposed respectively at the rear of the casing members 72 in optical alinement and exposure relation respectively with the lenses 75. These guides 76 form an exposure or picture plane for the portions of two feed perforated photographic picture strips 77, such as standard motion picture film strips, respectively engaged therein, each of these guides comprising a rear wall 78 of a casing member 72 and provided with an exposure aperture 79 arranged in exposure relation with the lens 75 of this casing member and a back guide plate 81 rearwardly adjacent the rear wall 78 and comprising a film strip between it and the rear wall.

Film strip guide studs 82 are mounted on the base 73 respectively adjacent the ends of the guides 76 for guiding the film strips 77 respectively to and from the guides from the rear thereof.

Two laterally spaced film feed spools 83 are rotatably mounted on the base 73 in corresponding relation with corresponding ends of the guides 76 and to the rear thereof, and two laterally spaced film take-up spools 84 are rotatably mounted on the base in corresponding relation with the other corresponding ends of the guides. Each film strip 77 leads from a roll thereof on a feed spool 83, then about the adjacent guide stud 82, then through an exposure guide 76, then about the guide stud 82 at the other end of this guide, and then to a roll of this strip on the adjacent take-up spool 84 which is rotated as is usual to feed the film strip through the exposure guide for the exposure of a succession of pictures on the strip.

Two laterally spaced sprockets 85 are rotatably mounted on the base 73 and are respectively engaged by the usual feed perforations of the film strips 77 between the take-up spools 84 and corresponding ends of the exposure guides 76, usual releasable spring-urged retaining devices, generally designated at 86, maintaining the film strips in engagement with the sprockets.

These sprockets are rotatably connected by a usual gear train 87 for accurately synchronizing feed movement of the film strips 77, terminal gears 88 of the gear train being fixed for rotation with the sprockets and a manually rotated handle 89 being fixed for rotation with an intermediate gear 91 of the gear train for rotating the sprockets to feed the film strips.

Two gears 92 are rotatably and slidably mounted on two laterally spaced spindles 93 which are rotatably mounted on the base 73 and on which the take-up spools 84 are detachably mounted in rotatably fixed relation therewith in a usual manner. See particularly Figure 10. Collars 94 are secured respectively on the spindles 93 and are provided with pointed pins 95 which are respectively engageable by notched faces 96 of the gears 92, and springs 97 urge the gears 92 into engagement with the pins 95 to provide a yielding driving engagement between the gears 92 and the spindles 93 and the take-up spools 84. Two gears 93 respectively mesh with the adjacent terminal gears 83 of the gear train 87 and with the adjacent gears 92 to take up the film strips on the take-up spools 84 as it is fed by the sprockets 85, the yielding drive of the take-up spools accommodating the rotation of the take-up spools to the feed of the film strips by the sprockets.

A circular surfaced member 99 is fixed for rotation with the intermediate gear 91 of the gear train 87 and is thus fixed for rotation with the sprockets 85. The member 99 is provided with a notch 101, and a detent arm 102 is pivotally mounted on the base 73, as designated at 103, and is provided at its free end with a detent tooth 104 engageable against the member 99 and releasably engageable with the notch 101 when in registry therewith. A spring 105 yieldably urges the arm 102 against the member 99 and releasably engages the tooth 104 with the notch 101 when the tooth and notch are registered, thus accurately registering predetermined corresponding exposure frames of the film strips 77 at the exposure apertures 79.

The stereoscopic camera, as illustrated in Figures 9 and 10, is thus adapted for the use of standard feed perforated motion picture film strips and utilizes the usual film spools employed in still cameras utilizing standard motion picture film. The stereoscopic viewer illustrated in Figures 1 to 8 is adapted to use either the film strips exposed in the camera of Figures 9 and 10 and developed or reproductions thereof, it being understood that, as shown, the film strips 77 of Figures 9 and 10 may be utilized in the viewer of Figures 1 to 8 by splicing the developed strips 77 of Figures 9 and 10 or reproductions thereof into endless belts to form the strips 17 of Figures 1 to 8.

It will be observed that, inasmuch as the novel feeding mechanism involves two stereoscopically related picture plane forming strip feed guides spaced longitudinally through which two picture strips are fed, a desirably large picture frame may be employed utilizing standard motion picture film in that the horizontal or larger dimension of the picture frame is disposed longitudinally of the film or picture strips and is thus not limited by the relatively narrow width of the picture strips.

The picture strips in the viewer are transposed in the viewer relative to the positions of the picture strips 77 in the camera so that the scenes are viewed in the viewer as the original scenes were presented to the camera, this transposition being facilitated by the employment of two stereoscopically related picture strips.

While I have thus described my invention, I do not wish to be limited to the precise details described, as changes may be readily made without departing from the spirit of my invention, but having thus described my invention, I claim as new and desire to secure by Letters Patent the following:

1. In a stereoscopic apparatus, the combination of two similarly disposed picture plane forming strip feed guides spaced longitudinally thereof, means for feeding two feed perforated picture strips in synchronism respectively through said guides comprising two spaced rotatable sprockets respectively engaging feed perforations of said strips beyond corresponding ends of said guides and driving means rotatably connecting said sprockets, two spaced rotatable take-up spools engaging respectively said strips to take up the same from said sprockets, and yieldable driving means for driving said take-up spools with said sprockets.

2. In a stereoscopic apparatus, the combination of two similarly disposed picture plane forming strip feed guides spaced longitudinally thereof, means for feeding two feed perforated strips in synchronism respectively through said guides comprising rotatable sprocket means operative between and engaging feed perforations of both of said strips, and means operative on said sprocket means for indicating successive predetermined movements of said strips comprising a first indicating member fixed for rotation with said sprocket and a second indicating member cooperatively engageable with said first indicating member and one of said indicating members being yieldably urged into cooperative engagement with the other indicating member.

3. In a stereoscopic apparatus, the combination of two similarly disposed picture plane forming strip feed guides spaced longitudinally thereof, means for feeding two feed perforated picture strips in synchronism respectively through said guides comprising rotatable sprocket means operative between and engaging feed perforations of both of said strips beyond corresponding ends of said guides, two spaced rotatable take-up spools engaging respectively said strips to take up the same from said sprocket means, yieldable driving means for driving said take-up spools with said sprocket means, and two spaced rotatable feed spools engaging respectively said strips beyond the other corresponding ends of said guides for feeding the strips thereto.

4. In a stereoscopic apparatus, the combination of two similarly disposed picture plane forming strip feed guides spaced longitudinally thereof, means for feeding two feed perforated picture strips in synchronism respectively through said guides comprising two spaced rotatable sprockets respectively engaging feed perforations of said strips beyond corresponding ends of said guides and driving means rotatably connecting said sprockets, means operative on said sprockets for indicating successive predetermined movements of said strips comprising a first indicating member fixed for rotation with said sprockets and a second indicating member cooperatively engageable with said first indicating member and one of said indicating members being yieldably urged into cooperative engagement with the other indicating member, two spaced rotatable take-up spools engaging respectively said strips to take up the same from said sprockets, yieldable driving means for driving said take-up spools with said sprockets, and two spaced rotatable feed spools engaging respectively said strips beyond the other corresponding ends of said guides for feeding the strips thereto.

5. In a stereoscopic apparatus, the combination of two similarly disposed picture plane forming strip feed guides spaced longitudinally thereof, means for feeding two feed perforated picture strips, each comprising an endless belt, in synchronism respectively through said guides comprising a rotatable sprocket engaging feed perforations of both of said strips and disposed between and opposedly operative on stretches thereof extending from the adjacent ends of said guides, two sets of spaced guide rollers respectively engaging said strips between said sprocket and the remote ends of said guides and the rollers of each set being spaced in zigzag arrangement and providing a corresponding zigzag path of the strip engaged thereby, and means yieldably urging one roller of each set of rollers against the strip engaged thereby to tension the strips.

6. In a stereoscopic apparatus, the combination of two similarly disposed picture plane forming strip feed guides spaced longitudinally thereof, means for feeding two feed perforated picture strips, each comprising an endless belt, in synchronism respectively through said guides comprising a rotatable sprocket engaging feed perforations of both of said strips and disposed on one side of the picture plane of said guides and between and opposedly operative on stretches of said strips extending from the adjacent ends of said guides, two sets of spaced guide rollers disposed on said side of the picture plane of said guides and respectively engaging said strips between said sprocket and the remote ends of said guides and the rollers of each set being spaced in zigzag arrangement normally of the plane of said guides and providing a corresponding zigzag path of the strip engaged thereby, and means yieldably urging one roller of each set of rollers normally of the plane of said guides and against the strip engaged thereby to tension the strips.

7. In a stereoscopic viewer, the combination of a supporting casing forming an enclosure and comprising spaced vertically disposed side members, the lower portions of which form a foot portion for supporting the casing on a horizontal supporting surface, and a wall member extending between said side members above said foot portions and forming with said side members an enclosure above said supporting surface and having an upwardly and forwardly disposed opening, a stereoscopic picture viewing unit disposable within said enclosure in a position extending forwardly and upwardly and provided with a viewing apertured wall member arranged at the forward end of said unit and adapted to close said opening and provided with manually operable control means accessible from below the same, forwardly and upwardly extending slide bearing means on said side members and carrying said viewing unit for corresponding movement into and out of said position, illuminating means carried by said casing within said enclosure and above said viewing unit, and said viewing unit being provided with reflecting means disposed to reflect light from said illuminating means forwardly therein for viewing.

8. In a stereoscopic viewer, the combination of a flat frame, picture plane forming picture strip feed guide means and associated picture strip feed means carried with said frame above the same, a second frame comprising a flat frame part disposed correspondingly with said first mentioned frame and a wall part extending upwardly from said second frame part at the forward end thereof and provided with laterally spaced viewing apertures therethrough in viewing relation with said picture plane, a pair of laterally spaced viewing lenses carried with said second frame inwardly of said viewing apertures in viewing relation with said picture plane, bearing means operative between said first mentioned frame and said second frame part providing relative movement of said frames normal to said picture plane, manually actuable means accessible from below said first mentioned frame and said second frame part and operatively connected with said feed means, and a second manually actuable means accessible from below said first mentioned frame and said second frame part and operative to adjust said frames normal to said picture plane.

9. In a stereoscopic viewer, the combination of a flat frame, picture plane forming picture strip guide means and associated picture strip feed means carried with said frame above the same, a second frame comprising a flat frame part disposed correspondingly with said first mentioned frame and a wall part extending upwardly from said second frame part at the forward end thereof and provided with laterally spaced viewing apertures therethrough in viewing relation with said picture plane, a pair of viewing lenses carried with said second frame inwardly of said viewing apertures in laterally spaced axially parallel viewing relation with said picture plane and for independent movement corresponding with the common axial plane thereof, bearing means operative between said first mentioned frame and said second frame part providing relative movement of said frames normal to said picture plane, manually actuable means accessible from below said first mentioned frame and said second frame part and operatively connected with said feed means, a second manually actuable means accessible from below said first mentioned frame part and said second frame part and operative to adjust said frames normal to said picture plane, and a third manually actuable means accessible from below said first mentioned frame and said second frame part and operative to laterally adjust said viewing lenses.

10. In a stereoscopic viewer, the combination of a wall part provided with a pair of laterally spaced viewing apertures therethrough and provided with an undercut slide channel at its rear face extending correspondingly with the common axial plane of said apertures and embracing said apertures, a pair of viewing lenses, a pair of apertured carrier members respectively carrying said lenses in their apertures and in laterally spaced axially parallel relation and independently slidably mounted in said channel for lateral adjustment of said viewing lenses relative to said viewing apertures, an adjusting member pivotally mounted on said wall member on an axis parallel to and between the axes of said viewing apertures and provided with diametrically opposite cam formations between said carrier members and operative respectively thereon for simultaneously oppositely adjusting the same away from each other, and spring means operative on said carrier members to actuate them toward each other.

HERBERT J. TICKELL.